United States Patent Office 3,255,281
Patented June 7, 1966

3,255,281
PROPELLANT CASTING METHOD
Earl L. Alexander, Jr., Chatsworth, Calif., assignor to North American Aviation, Inc.
Filed June 21, 1960, Ser. No. 37,717
11 Claims. (Cl. 264—3)

This invention relates to a method of casting polymeric materials containing solid filling substances. More particularly, this invention relates to a method of casting articles of polymeric materials containing solid filling substances wherein the composition is varied during casting.

In a co-pending application of the common assignee, Serial No. 699,632 now United States Patent No. 3,022,149, a process is described for the manufacture of plastic or polymeric materials containing solid filling substances. The process comprises dispersing the polymeric materials and the filling substances in fluid carriers and bringing streams of the various dispersions together in a manner which will result in the thorough mixing of all the various dispersions. The dispersed substances are then permitted to agglutinate and settle out to form a composition of substantially uniformly dispersed filling substances in the polymerizable material. The agglutinated polymer and filling substances are cured in a conventional manner to form finished articles of manufacture. This method is applicable to the casting of solid rocket propellants consisting of an oxidizer and a binder. The maximum amount of solids in the product is somewhat limited due to the requirement of a minimum amount of polymeric material as a binder dictated by the process employed. A portion of the fine particles in the dispersions may pass through with the carrier, lowering the efficiency of the process as well as affecting the physical properties of the finished product. A need, therefore, exists for an improved process of making articles of polymeric substances containing solid filling substances dispersed therethrough.

It is therefore an object of this invention to provide a novel process for the manufacture of articles made of polymeric materials having solid filling substances dispersed therethrough. It is also an object to provide a process for the manufacture of such articles whereby the composition can be varied during casting. Another object is to provide a process which will result in a minimum of flaws in the finished product. Another object of this invention is to provide a method for the casting and molding of solid rocket propellants. Another object is to provide a method for the casting of solid rocket propellant with a minimum of flaws and with improved specific impulse. It is likewise an object of this invention to provide a method of casting solid particulate filling substances containing polymeric articles having improved mechanical properties. It is also an object of this invention to provide novel compositions of matter and solid rocket motor components. Still other objects will be apparent from the discussion which follows.

The above and other objects of this invention are accomplished by a process for molding an article which is comprised of polymeric substances containing filling materials therethrough, comprising providing a stream comprised of a fluid carrier having dispersed therein polymeric substances and filling materials, feeding the contents of said stream into a rotating mold, rotating said mold during said feeding so as to impart a centrifugal action to said dispersed components, thereby separating said dispersed components from said carrier, collecting the components in said mold and withdrawing the fluid carrier from the mold. The process is applicable to the use of a mold which rotates about an internal axis. The mold is rotated at a number of revolutions per minute, r.p.m., sufficient to exert a centrifugal force on the polymeric materials and filling substances being fed into the mold, thereby driving them to the outer confines of the mold, that is, the confines furthest removed from the axis of rotation. The fluid carrier is withdrawn from the mold through a discharge port at the axis of rotation. An illustrative example of the method of this invention involves a process for the manufacture of a rocket propellant. A rotating cylindrical mold is used. The mold has one end closed and the other end only partially closed. The partially closed end is equipped with inlet means in the area corresponding to the position of the axis of rotation of the mold. Outlet means for the fluid carrier are also provided at the axis of rotation in the partially closed end. The fluid carrier is withdrawn from the mold through a circular discharge port centered at the axis of rotation. The discharge port is of a diameter approximately equal to the cylindrical coaxial cavity to be formed in the molded product at the axis of rotation.

In a non-limiting example, di(thioethoxy)methylene polymer and ammonium perchlorate are dispersed in n-heptane. The ammoniua perchlorate-to-polymer in the dispersed stream is from about 1:1 to about 9:1. The stream is fed into the mold through the inlet port. The mold is rotated at an r.p.m. sufficient to drive the di(thioethoxy)methylene polymer and ammonium perchlorate particles to the outer confines of the mold. The lighter n-heptane carrier accumulates in the inner volume of the rotating mold and eventually escapes through the exhaust port as the amount of material in the mold is increased. The feed of the stream to the rotating mold is continued until the desired thickness of propellant and binder are accumulated on the outer wall. The cast propellant, often called the propellant grain, is then subjected to conditions which bring about a curing of the di(thioethoxy)methylene polymer binder. This provides a propellant grain having a minimum of flaws and a maximum specific impulse.

An embodiment of this invention is the varying of the composition of the binder and of the filler during the process of casting. For example, in the casting of a rocket propellant, the particle size of the oxidizer which constitutes the filling material is varied as the propellant grain is built up. Alternatively, the composition of the polymer binder material is varied from a binder which, upon curing, is relatively hard near the rocket motor casing to a binder which is more rubbery near the center of the grain in order that stresses built up during normal shrinkage of the grain during cure and due to possible loss of small amounts of dissolved heptane may be relieved. Decay of accumulated stress varies markedly with polymer compositions. The highest tensile stress is at the surface of the grain cavity. At this point it is advantageous to have a resilient binder of a rubbery nature with moderately high stress decay properties. At the outer radius it is preferred to have greater tensile strength which can be obtained by chemical modifications at the expense of elongation or resilient character.

In still another embodiment of this invention, both the particle size of the propellant as well as the composition of the binder are varied.

The process of this invention is more readily described with the aid of the accompanying drawings. FIG. 1 is a flow diagram of the apparatus to which various components are fed and converted into the final product. FIG. 2 shows an enlarged cross sectional view of the mold casing and centrifuge basket used in the casting of the polymeric material.

A description of the drawings will be made with reference to the casting of a solid rocket propellant grain for the purpose of a more ready comprehension of the process of this invention. It is to be understood, however, that the process is equally applicable to the casting of any article composed of a polymeric material and solid particulate filling substances by the method hereinafter described.

In FIG. 1, hoppers 11, 12, and 13 contain solid particulate filling materials or substances, such as ammonium perchlorate, of varying particle size distribution. The solid particles are fed to dispersion mills 39, 40, and 41 through lines 23, 24, and 25 containing valves 17, 18, and 19 respectively. A dispersion medium or carrier is contained in vessel 31. This vessel is equipped with an inlet line 30 having a valve 29. The dispersion medium, for example n-heptane, is conducted through a conduit header 32 which services lines 33, 34, and 35 leading to dispersion mills 39, 40, and 41, respectively. The amount of dispersion medium fed to the mills is controlled by valves 36, 37, and 38 in lines 33, 34, and 35, respectively. The amount of solid substances fed to these mills is likewise controlled by valves 17, 18, and 19. The slurries of dispersed particles formed in the dispersion mills are fed to a mixing area 57 through valves 45, 46, and 47 in lines 42, 43, and 44, respectively. A plurality of storage vessels, which may be equipped with inlet lines and valves, not shown, contain the binder components such as, for example, di(thioethoxy)methylene prepolymer in 14, an amine curing agent in 15, and plasticizer in 16. The components of the binding compositions are withdrawn from the storage vessels by pumps 48, 49, and 50, which can be metering pumps, through lines 26, 27, and 28 containing valves 20, 21, and 22. The components are then fed by the pumps through lines 51, 52, and 53, through a common conduit 54 and into a colloid or dispersion mill 55 operated by motor 56. The amounts of the components fed to the dispersion mill are regulated either by valves 20, 21, and 22, or by metering pumps 48, 49, and 50. To the dispersion mill 55 is fed a dispersion medium from container 72 through line 73 containing valve 74. This dispersion medium can be the same as that fed from container 31, i.e., n-heptane. The dispersed binder components together with the fluid carrier are fed through line 74 to the mixing area 57. A valve may be placed in line 75 for control of the feed therethrough if required. Although the various components of the binder composition were dispersed together in one dispersion mill in this instance, they can be dispersed in separate mills and then fed as one stream or a plurality of streams into the mixing area 57. After being mixed in the mixing area, the various components with the carrier medium are conducted through line 58 into a rotating mold 59. The mold is rotated by means of motor 60.

FIG. 2 shows a cross sectional view of a mold casing 61 contained in a centrifuge bowl 62. The centrifuge bowl is driven by motor 60 through drive shaft 63. The motor is preferably a variable speed motor in order to be able to rotate the centrifuge at various r.p.m.'s. Alternatively, the motor is replaced by the combination of a motor and a set of reduction gears, not shown, to obtain a particular desired r.p.m., or the motor may be air-driven with speed varied by supply pressure. The dispersed components and carrier fluid 76 is fed through conduit 64, which is shown as line 58 in FIG. 1, into the rotating mold casing 61. The mold casing in this figure is shown to be closed at its lower end and having a cover 65, with an opening 66, at its other end. The conduit 64 passes through the opening 66 into the interior of the rotating mold. The centrifugal force within the rotating mold causes the dispersed solid particles and binder components to settle out on the surfaces of the mold furthest removed from the axis of rotation, shown in the figure as deposit 67. The carrier 68, n-heptane in this instance, eventually fills the inner area of the mold and flows out over the lip of opening 66 in the cover 65 and is collected in container 69 from which it flows through spout 70 into receiving vessel 71. The carrier fluid can be reused in the operation.

The mold casing in FIG. 2 is shown to have one closed end. However, cylindrical mold casings, with both ends open, are also employed. In the latter case, a sheet of aluminum foil is placed on the bottom of the centrifuge basket or bowl 62 and the mold allowed to rest on the foil. The aluminum or other foil is used merely to later facilitate the removal of the cast article from the centrifuge bowl.

In general, this invention may be defined as constituting a process for the manufacture of mixtures of polymeric materials and filling substances comprising (1) at least one dispersion of a polymer-forming material, which upon curing forms a substantially solid, cohesive substance, in liquid dispersion mediums, and (2) at least one dispersion of solid particulate filling substances in liquid dispersion mediums, the dispersion mediums being mutually miscible, mixing the dispersions together in predetermined proportions to provide the desired relationship in parts by weight between the solid particulate filling substances and the polymer-forming materials. A single composite stream of dispersion medium containing dispersed components therein is thereby provided. The ratio of dispersed solids-to-dispersed polymer or resin is maintained at from about 1:99 to about 9:1 in parts by weight. The contents of the composite stream are then fed into a rotating mold. The mold rotates as an r.p.m. sufficient to impart a centrifugal force to the components deposited therein. A separation of the dispersed components from the carrier is thereby brought about with the dispersed components being collected in the mold. The carrier fluid is withdrawn from the mold and reused. Curing agents, catalysts, burning agents, burning rate inhibitors, burning rate accelerators, and other ingredients beside the filling substances are added to produce certain compositions. These other components are included with the dispersions of the polymerizable materials if liquid in form, or with the dispersions of filling substances if solid in form, or they are made up as separate dispersions in mediums which are miscible with the other dispersion mediums. In the latter case, all the dispersions are mixed together as explained above.

One embodiment of this invention is to employ dispersion mediums which are non-solvent and non-reactive toward the dispersed substances. It is also often found advantageous to use organic dispersion mediums, and this constitutes another embodiment of this invention.

The mixture of polymeric material and solid filling substances which are collected in the rotating mold are cured at ambient or elevated temperatures to provide substantially solid plastic or polymeric articles having dispersed solid materials therein.

The polymeric materials include polymer-forming resins and plastic materials which, upon curing by chemical means, or by the application of heat or a combination of the two, form substantially solid cohesive substances. The method described above serves as a process for the preparation of what is termed in the art as loaded plastics. The method is also useful in the preparation of putties.

The polymer or a precursor of the polymer, referred to hereinabove as a polymeric material, is usually in a partially polymerized viscous form. The dispersion of this polymeric material is therefore a dispersion of a liquid in a liquid. The relative proportions of the dispersed phase and dispersion medium is such that the weight ratio of dispersed polymer of resin-to-dispersion medium is from about 1:19 to about 1:1. More dilute dispersions are ordinarily not used, although they can be, in order to minimize the handling of excessive amounts of diluent. An example of a dispersion of a polymeric material is a dispersion of di(thioethoxy)methylene having an average molecular weight of about 2,000 and an ambient temperature viscosity of substantially 1,000 centistokes in n-heptane. The dispersion is formed by agitation as with a mechanical stirrer until the composition approaches a state of emulsion. This polymer dispersion is then blended with a dispersion of a filling material such as a dispersion of solid ammonium perchlorate in n-heptane.

Polymeric materials that are used in carrying out the process of this invention are glycidyl polyether compounds of polyhydric alcohols and polyhydric phenols of the type describe in U.S. Patents No. 2,767,157 and 2,883,308. An example of such a polymeric material is one obtained by the reaction of a mol of 2,2-bis(4-hydroxyphenyl)propane with one or more mols of epichlorohydrin in the presence of a base such as sodium hydroxide. This provides a glycidyl polyether composition having terminal epoxy groups. Another example of a polymeric material is a polyurethane material such as a copolymer of polypropylene glycol and toluene diisocyanate. A more specific example of a polypropylene glycol that is employed in one having an average molecular weight of about 2,050. The resultant prepolymer material has a structural formula

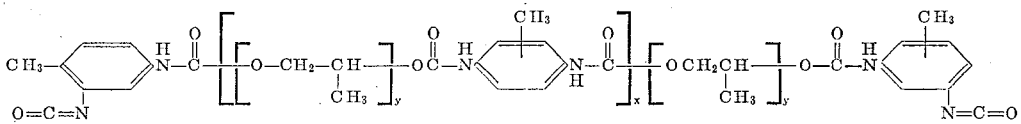

wherein $x$ is selected from the series 1,2,3 . . . and has a maximum value of about 10, and $y$ has an average value of about 35 in the case of a polypropylene glycol having an average molecular weight of about 2,050. The —NCO groups at the ends of the polymeric molecules are capped with a polyhydric alcohol such as, for example glycerine, butanediol hexantriol, castor oil, etc. In general, the polyurethane material is prepared by reacting polypropylene glycol and toluene diisocyanate in predetermined proportions in a reaction vessel. One example is the reaction of 2 mols of toluene diisocyanate with one mol of polypropylene glycol. The two react at room temperature. However, the temperature is usually raised to from about 200° F. to about 260° F. in order to accelerate the reaction. During the reaction small samples are periodically withdrawn and the percent of —NCO group determined by titration, and when the desired degree of reaction has been reached, that is, when the percent of —NCO groups has dropped to one-half its initial value, the end-capping reactants are added in an amount equal to one mol of end-cap molecule-to-one mol equivalent or —NCO groups remaining uncombined. The reaction products constitute a prepolymer. The mol ratio of toluene diisocyanate-to-polypropylene glycol can vary in the resin from 2:1 to about 1:1. As the ratio approaches 1:1 the prepolymer yields a final cured product which has a more resilient characteristic.

The number or unreacted —NCO groups is determined by adding a known excess of n-butyl amine and back titrating with HCl using a bromcresol green indicator.

In the casting of a rocket propellant grain in which dispersions of oxidizer particles and polymer are mixed, a dispersion of a curing agent is added. For the prepolymer just described, an isocyanate group-containing compound is used. An example of such a compound is polyphenylpolyisocyanate. It is added to the composition in amounts sufficient to provide an OH-to- —NCO equivalents ratio of from about 2:1 to about 5:6. The OH groups are found on the prepolymer as a result of uncombined hydroxyl groups on the endcapper added, and the —NCO groups are introduced with the curing agent.

Polymeric products in which the ratio of OH groups in the prepolymer-to- —NCO groups of the curing agent added is 5:6 have the characteristic of high modulus, low elongation, relatively low resiliency, and high cross-link density. Polymeric products in which the ratio is 2:1 have a characteristic of more rubber-like quality with higher elongation, lower modulus, and low cross-link density. Ratios of 3:2 and 4:3 with intermediate properties are also obtained by controlling the amount of curing agent added. The above holds true from instances wherein the number of OH groups on a prepolymer molecule is at least 3 and the number of —NCO groups on the curing agent is at least 2. This is necessary in order that cross-linking may occur.

Other polymeric materials that are employed in this process are silicone polymers and rubbers of the type described in a text entitled, "An Introduction to the Chemistry of the Silicones," by E. G. Rochov, 2nd edition (1951), published by John Wiley and Sons, Inc., New York. An example of a silicone polymer is a silicone gum obtained by heating a hydrolysate of a mixture of 90 mole percent dimethyldichlorosilane and 10 mole percent of diphenyldichlorosilane in the presence of a small amount of iron chloride. The composition is subjected to heating for a period of time sufficient to obtain a viscous liquid. Another polymeric material is a copolymer obtained by the reaction of a dihydrocarbon-substituted silane-diol with a dihydrocarbon-substituted diisocyanatosilane. These are fully described in U.S. Patent No. 2,932,586, of the common assignee. Non-limiting examples of still other polymeric materials are polymers having the general formula $$HS(SR—O—CH_2—O—RS)_nSH$$

in which R is a saturated hydrocarbon group having from 1 to about 12 carbon atoms and $n$ is a number selected from the series 1, 2, 3 . . . , isocyanate resins having the general formula $$OCN—C_3H_6—O(C_3H_6—O)_n—C_3H_6—NCO$$

wherein $n$ is defined above, and wherein the molecular weights of the polymers are from about 2,000 to about 3,000, and vinyl polymers. Other resins and polymeric substances that can be used will be apparent to those skilled in the art.

The process of this invention is adaptable to the prepartion of compositions of uniformly varying amounts of dispersed solid material in polymers wherein the latter ordinarily are polymerized in solution. In this case, dispersions or solutions of polymer components, as well as of the solid materials, are prepared, mixed together, and the polymerization allowed to proceed while the components are being cast in a rotating mold.

An embodiment of this invention is to progressively vary the composition of the binder components during the casting of a polymeric article containing solid particulate filling substances. When the casting is performed in a mold rotated about an internal axis, the composition of the polymeric material is progressively varied as the article is centrifugally built up. That is, the composition of the binder at the point, or annular shell, of deposition varies as the distance from the axis of rotation of the deposit is decreased. An embodiment of this invention is to progressively feed a composition to the rotating mold in which prepolymer molecular weight is being varied. This provides an article having a high strength and modulus characteristic at points relatively more distant from the axis of rotation of the mold, and a more resilient or rubbery texture nearer the axis of rotation of the mold. This is advantageous in the casting of rocket propellants in order to relieve and absorb stress during the cure step or during combustion and flight.

One method of accomplishing the variation in the property of the polymeric substance is to increase the amount of curing agent as the article is built up in the rotating mold. Another method is to change the composition of the polymer being fed to the rotating mold. For example, a polymer (A) obtained by copolymerizing polypropylene glycol and toluene diisocyanate in the mol ratio of 1-to-1 provides a substantially linear rubber polymer.

On the other hand, the copolymerization of (B), a tetrafunctional prepolymer such as toluene diisocyanate-capped polypropylene glycol which is again capped with hexane triol or castor oil with a difunctional cure agent such as toluene diisocyanate yields a more rigid cross linked polymer. A polyfunctional (greater than two functional groups) cure agent such as a polyarylpolyisocyanate can be used to obtain even higher degrees of cross linking and greater rigidity. Thus, feeding a polymeric composition to the rotating mold in which polymer (B) is the predominate component in the initial feeding and progessively adding more and more polymer (A) to the feed will result in an article whose composition becomes more and more resilient and rubbery as the distance from the axis of rotation is decreased. Illustrations by which the variations in the polymeric composition are obtained are more fully described in the examples herebelow.

The solid substances with which the polymeric materials are loaded include inert pigments such as titanium dioxide, lead oxide, ferric oxide, carbon black; powdered metals and alloys such as copper leafing powder, aluminum flake bronze powder; metal fluorides such as calcium fluoride and sodium fluoride; mica particles; asbestos fibers, glass fibers, fuller's earth and other clay compositions, etc. When the solid particulate filling substances are oxidizing agents, as is the case in propellant compositions, they include metal perchlorates, metal nitrates $NH_4ClO_4$, $NH_4NO_3$, etc.

The perchlorates employed as oxidizing agents or oxygen carriers in the composition are anhydrous and have the general formula $M(ClO_4)_x$ wherein M is $NH_4$ or a metal and $x$ is the valence of M. Since the propellant composition is required to withstand high temperature storage, it is preferable that the melting point and the decomposition temperatures of the oxidizer be as high as possible. The perchlorates of the Group I–A, Group I–B, and Group II–A metals are found to have the required high temperature stability and are employed in the preparation of propellant compositions by the process of this invention. Hence, the metal perchlorates used in the preparation of the propellant compositions include lithium perchlorate, sodium perchlorate, potassium perchlorate, rubidium perchlorate, and cesium perchlorate which are the perchlorates of the metals of Group I–A of the periodic table of elements; silver perchlorate which is a perchlorate of a Group I–B metal; and magnesium perchlorate, calcium perchlorate, strontium perchlorate, and barium perchlorate which are the perchlorates of the Group II–A metals. In addition to the metal perchlorates, the compound ammonium perchlorate finds extensive use in propellant compositions.

Examples of the nitrates of the Group I–A, and I–B and II–B which are employed in preparing propellant compositions by the process of this invention are compounds such as lithium nitrate, sodium nitrate, potassium nitrate, magnesium nitrate, calcium nitrate, barium nitrate, strontium nitrate, etc. Ammonium nitrate is also used.

The solid particulate substances have a particle size which ranges from about 1 to about 500 microns in diameter. In the case of solid particulate substances employed in rocket propellants, e.g. oxidizers, the particle sizes fall into two general classifications, fine and coarse. The fine particles range in size from about 1 to about 60 microns in diameter, while the coarse particles range in size from about 50 to about 500 microns in diameter. The combination of the fine and coarse sized particles is employed in the casting of rocket propellants in order to obtain a maximum loading of oxidizer in the propellant grain. To accomplish this it is found that from about 25 to about 35 weight percent of the solids are fines and the balance are coarse.

The oxidizer particle size is one of the factors which controls the burning rate of a solid rocket propellant grain. One of the embodiments of this invention is to cast a propellant grain with a progressively varying particle size of the oxidizer component. In this manner the burning rate of a propellant grain is controlled as the grain burns away and a larger burning surface area is exposed. This is especially true of a cylindrically shaped propellant grain having a coaxial burning channel. The average particle size of the oxidizer is progressively decreased with increasing distance from the outer container. The propellant grain will therefore contain oxidizer particles of a relatively smaller size near the axis of the cylindrical grain. This will provide for a faster burning rate per unit surface area in the axial burning channel during the initial firing of the propellant. The faster burning is required at this point because of the substantially smaller amount of surface area exposed and made available for burning. The objective is to achieve a balance between propellant burning rate per unit area and total burning surface at all times during combustion in order to fix the combustion chamber pressure, and, hence, rocket thrust, at a constant value during the burning time or to control delivered thrust as a function of burning time. A method of accomplishing the change in particle size during casting is more fully described in the examples given hereinbelow.

The ratio of solids-to-polymeric binder material in a propellant falls in the range of from about 1:1 to about 9:1 with an optimum ratio of about 4:1.

Other substances which are employed in the preparation of propellants by the process of this invention include minor amounts of burning catalysts, well known in propellant compositions. These are composed of one or a mixture of two or more metal oxide powders in amounts sufficient to improve the burning rate of the composition. The amounts usually range from about 0.01 to about 3 weight percent, based on the weight of the oxidizer employed. The particle size of the powders can range from about 3 to about 250 microns in diameter. Non-limiting examples of metals that serve as burning catalysts are aluminum powder, aluminum flakes, aluminum fibers, lithium, copper, vanadium, chromium, silver, molybdenum, zirconium, antimony, manganese, iron, cobalt and nickel. Examples of metal oxide burning catalysts are ferric oxide, copper oxide, chromic oxide, and copper chromates, as well as the oxides of the other metals mentioned above. Lithium hydride and other alkali metal hydrides are also used.

Burning depressants such as calcium oxalate, or other compatible materials which may serve as a heat sink by virtue of endothermic decomposition ahead of the advancing flame front may also be included in the preparation of solid propellant grains.

The solid particulate substances in some instances are added in the form of fibers as well as in the form of powdered particles. The cross sectional diameter of fibers ranges from about 3 to about 250 microns. In the casting of rocket propellants, for example, aluminum fibers are included in higher concentration in the composition first fed into the rotating mold, and the concentration gradually decreased in the subsequent feed stream. In this manner, the concentration of the aluminum fibers will gradually decrease in the cast article as the radius or distance from axis of rotation decreases. Another method of varying the composition is to substitute aluminum powder for an increasing fraction of the aluminum fiber during the feeding of the components to the rotating mold. Alternatively, other powders may be substituted for the aluminum, such as lithium powder, lithium hydride powder, etc.

Another embodiment of this invention is to vary the amount of burning catalyst and burning suppressant in the feed stream admitted to the rotating mold. For example, the intial feed stream can contain a relatively large percentage of a burning suppressant such as, say, calcium oxalate, with the amount of the suppressant being progressively decreased in the subsequent feed and a burning rate catalyst, such as, say, copper chromate, is introduced into the feed stream at some time after the beginning of the casting and its amount progressively increased to some predetermined value. In this manner, a propellant grain is cast in which the burning rate per unit area upon ignition in the coaxial channel is accelerated but progressively decreases as the propellant is consumed and a greater surface area is exposed to burning. By balancing burning rate against increasing area the rate of generation of combustion products can be made relatively constant. High peak combustion chamber pressures can be avoided to permit a more lightweight motor case which is obviously a great advantage. Alternative techniques generally in use at present require a complex shape for the initial cavity to obtain a constant burning area and constant chamber pressure. However, the use of star-shaped cavities, for example, leads to stress concentration and possible crack formation at star points. Casting difficulties are also encountered. The use of a combination of burning catalysts and burning suppressants overcome these prior art shortcomings.

Curing catalysts can also be added in minor amounts to the dispersions in the performance of the process of this invention. When the catalysts are of a solid nature, they are dispersed together with the other solid materials; when the catalysts are liquid in form, they are included with either the dispersion of the polymeric material or with the dispersion of the solid substance. If the catalyst is such that it brings about curing or setting up of the polymeric material at ambient temperatures, it is preferred to form a separate dispersion of such a catalyst or include it with the dispersion of the solid substance in order that the polymer does not set up prior to the formation of the agglutinate of the solid material and polymeric substance. Non-limiting examples of catalysts used for this purpose are aluminum chloride, tris-trimethylsilyl borate, benzoyl peroxide, and other catalysts well known in the curing of plastics, resins, polymers, and rubbers. Examples of various catalysts may be found in text books such as "Synthetic Rubber," by G. S. Whitby, pp. 892–933, 1954 ed., published by John Wiley and Sons, Inc., N. Y. The curing catalysts are added in amounts of from 0.1 to about 10 weight percent, based on the weight of the polymer, resin, or elastomer, preferably 0.1 to 6 weight percent.

The vehicles which are used as the dispersion mediums should be either non-solvent or equilibrated with respect to the dispersed substances. Equilibrated vehicles are those which contain a component essential to the propellant in solution as, for example, a curing agent which is recycled with the vehicle stream from the casting operation. A make up stream of the component is fed to the recycle loop at a rate sufficient to maintain the desired equilibrium concentration. A specific example of a soluble diisocyanate curing agent is hexamethylene diisocyanate. The degree of cure is controlled by the equilibrium concentration value. The same vehicle medium may be used for both the polymeric material and the solid substances or, conversely, different vehicles or dispersion mediums may be employed for the polymeric and the solid components. It is required only that the dispersion mediums for each of the polymeric and solid components be mutually miscible. Examples of dispersion medium which are employed in the carrying out of the process of this invention include aliphatic and olephinic hydrocarbons having from about 3 to about 16 carbon atoms. Examples of these are propane, butane, hexane, heptane, octane, dodecane and hexadecane, as well as 2-octane, 1-dodecane, 1-hexadecane, etc. Examples of cyclic hydrocarbons are cyclohexane, methylcyclohexane, dicyclohexane, etc. Examples of aromatic and alkyl aromatic compounds which are employed as dispersion mediums include compounds having from 6 to about 16 carbon atoms such as benzene, toluene, xylene, 2,4-di-pentylbenzene, phenyldecane, decalin, 1-hexyldecalin, etc. Halogen derivatives of the above hydrocarbons are also employed as dispersion mediums. Examples of these include ethylenedichloride, trichloroethylene, methylenedichloride, chlorobenzene, bromobenzene, iodobenzene. Compounds of the Freon series such as dichlorodifluoromethane, dichlorotetrafluoroethane, etc., are also employed.

Other possible dispersion mediums are alcohols having from 1 to about 12 carbon atoms and from 1 to about 3 hydroxyl groups. Examples of these are methyl alcohol, ethyl alcohol, benzyl alcohol, glycerine, dodecyl alcohol, etc. Amines which have from about 2 to about 12 carbon atoms and from 1 to about 3 nitrogen atoms are also used. These include such compounds as ethylenediamine, diethylenetriamine, dodecylamine, pyridine, quinoline, etc. Ethers, ketones, aldehydes, and esters having from about 2 to about 16 carbon atoms are also used. Examples of these are ethyl ether, acetone, propionaldehyde, ethyl acetate, butyl dodecanoate, butyl cellosolve, etc. In addition, when different dispersion mediums are used for the polymeric and the solid components, it is necessary that these dispersion mediums be miscible one with the other. The properties of these various dispersion mediums with respect to miscibility and solvent power are well known to those skilled in the art and will not be discussed further in this writing.

The dispersions are formed with the aid of heat in cases where the dispersion medium is very viscous at ambient temperatures. Alternate methods are the use of gear pumps to pump viscous polymer streams to a colloid mill or impinging jet (vehicle plus carrier) mixer. The methods of preparing the dispersions themselves are well known and do not merit further discussion here.

The amount of dispersed material in the carrier varies from 1 to about 90 weight percent, based on the combined weight of dispersed material and carrier fluid. It is preferred not to make the dispersion too weak in dispersed material in order to avoid handling excessive quantities of carrier fluid. In the casting of solid rocket propellants, the oxidizer stream contains from about 5 to about 35 weight percent of solid oxidizer component. The preferred oxidizer dispersion contains from about 20 to about 30 weight percent of solid oxidizer components. The dispersion of other solid components added to the rocket propellant composition, such as aluminum powder or fibers, is found to be satisfactory when containing from about 1 to about 35 weight percent solids. Especially good results are obtained when the stream contains from about 8 to about 25 weight percent of such other solids and the use of such a stream constitutes a preferred embodiment of this invention.

The polymeric composition is dispersed in the carrier in amounts of from 10 to about 90 weight percent, based on the combined weight of the polymer and carrier fluid. Good results are obtained, however, when the amount of polymer is from about 40 to about 75 weight percent, based on the combined weight of polymer and carrier, and this latter range constitutes a preferred embodiment of this invention. In general, good results are obtained when the ratio by weight of dispersed material to dispersion medium is from about 1:19 to about 1:1, and dispersions having this composition constitute a preferred embodiment of this invention.

The following examples will more fully illustrate the process of this invention.

EXAMPLE I

Three hoppers, shown as bins 11, 12, and 13 in the drawing, are filled with ammonium perchlorate particles of different size ranges. Each of the bins contains 30 weight percent fines and 70 weight percent coarse particles of ammonium perchlorate. The fines in bin 11 are of a particle size range of from about 2 to about 20 microns in diameter, while the coarse are of a particle size ranging from about 50 to about 150 microns in diameter. The fines in bin 12 are of a particle size ranging from about 10 to about 40 microns and the coarse particles range from about 100 to about 200 microns in diameter. The fines in bin 13 are of a diameter in the range of from about 20 to about 60 microns and the coarse particles range from about 300 to about 500 microns in diameter. The binder prepolymer employed is a copolymer of polypropylene glycol and toluene diisocyanate capped with butanediol, as described hereinabove. The prepolymer is placed in containers 14, 15, and 16. The prepolymer container 14 has a toluene diisocyanate-to-polypropylene glycol molar ratio of substantially 2:1. The prepolymer container 15 has a toluene diisocyanate-to-polypropylene glycol molar ratio of substantially 3:2. The prepolymer in container No. 16 has a toluene diisocyanate-to-polypropylene glycol molar ratio of substantially 4:3. The ammonium perchlorate is dispersed in n-heptane in dispersion mills 39, 40, and 41 to provide dispersions containing 25 weight percent ammonium perchlorate. The prepolymer is dispersed in n-heptane in colloid mill 55 to make up a dispersion containing 70 weight percent of the prepolymer. The methods of forming the dispersions have been described hereinabove. The dispersions are fed to a rotating mold as described with reference to the drawings. The initial feed consists of a combination of the dispersion of the ammonium perchlorate from bin 11 and a dispersion of the prepolymer from container 14. Immediately after beginning the feed from bin 11 and container 14, the contents from bin 12 and container 15 are introduced. The amount of perchlorate coming from bin 12 varies continuously from 0 to 100 weight percent, based on the amount of ammonium perchlorate fed into the mold as the propellent grain is built up from a deposition at a maximum radial distance from the axis of rotation as determined by the outside walls of the rotating mold, to an annular shell at a distance from the axis of rotation equivalent to one-half the radius of the grain. At this point, the ammonium perchlorate from bin 13 is introduced into the feed stream in a manner such that the ammonium perchlorate composition varies continuously from 0 to 100 weight percent of the contents of bin 13 as the grain is built up from a thickness of one-half the radius of the grain to completion. The perchlorate feed rate from bin 12 is decreased linearly with time, or with total propellant accumulated in the motor, while simultaneously the feed rate from bin 11 is increased to maintain the overall percentage of ammonium perchlorate constant with respect to the grain radius. In like manner, the prepolymer fed is varied from the prepolymer contained in container 14 to that in container 15, and finally to that in container 16. A fourth container, not shown in the drawings, holds polyphenylpolyisocyanate curing agent. The amount of curing agent fed to the dispersion mill is sufficient to provide an OH-to- —NCO equivalents ratio of 5:6 initially, and gradually changes to 2:1. The OH groups and —NCO groups referred to are as described hereinabove. The composition of the molded propellant grain has a continuous variation of ammonium perchlorate particle size. An annular coaxial section farthest removed from the center of rotation of the mold contains ammonium perchlorate having a particle size represented by particles in bin 11. The annular section nearest the center of rotation of the mold contains ammonium perchlorate having a particle size represented by the particles in bin 13. In like manner, the composition of the polymeric binder varies from that represented by the contents of container 14 to that of the contents of container 16 as the radius of the propellant grain is decreased from the outermost coaxial surface to the innermost coaxial surface. The carrier fluid withdrawn through the opening in the mold cover is found to contain substantially no dispersed ammonium perchlorate particles or prepolymer. The cast propellant grain is placed in a furnace and maintained at a temperature of substantially 70° C. for a period of substantially 72 hours. At the end of this time the product is found to have set up so that the particles of ammonium perchlorate are firmly held together by the product polymer. The propellant composition has a firm but resilient texture and high cohesive quality. The ratio of dispersed solids-to-binder in this composition is substantially 4:1. The cast propellant is cylindrical in shape. It is 5½ inches long and 5 inches in diameter with a coaxial opening 2½ inches in diameter. The propellant performs satisfactorily upon firing in a rocket motor.

The amounts of the various components admitted to the feed stream is controlled by proper operation of the appropriate valves shown in the drawing.

More complex relations between feed rates and accumulated propellant are used in the design of propellant grains for specific missions. For example, if a gradual increase to peak acceleration followed by an acceleration plateau versus time is required, the proper ratio of feed from perchlorate bins 11 and 13 is varied in a more complex manner with the grain radius. It is not necessary to hold total percentage of perchlorate constant.

EXAMPLE II

The process of Example I is employed to obtain a composition containing manganese dioxide varying from 4 weight percent at the outermost annular shell section to 1 weight percent at the innermost annular cross sectional shell in a matrix of an epoxy resin obtained by reacting epichlohydrin with 2,2 - bis-(4-hydroxyphenyl)propane, which is further copolymerized with dimethylaminomethylphenol in the ratio of 26:1 in parts by weight of epoxy-to-phenol compound.

EXAMPLE III

The process of Example I is repeated with the modification that the ratio by weight of prepolymer-to-dispersion medium is 1:19 and the ratio by weight of ammonium perchlorate-to-dispersion medium is also 1:19, and the ratio by weight of ammonium perchlorate-to-prepolymer is 1:1.

EXAMPLE IV

The process of Example I is repeated with the modification that the ratio by weight of prepolymer-to-dispersion medium is 1:1, the ratio by weight of ammonium perchlorate-to-dispersion medium is also 1:1, and the ratio by weight of ammonium perchlorate-to-prepolymer is substantially 9:1, and the components are fed directly to the rotating mold.

EXAMPLE V

The procedure of Example I is repeated with the modification that in addition to bins 11, 12, and 13, three more bins are added, one containing copper chromate burning catalyst, one containing calcium oxalate burning depressant, and the third containing aluminum fibers having a cross sectional diameter of from about 5 to about 100 microns. The copper chromate is fed into the stream in a concentration of about 2 weight percent in n-heptane. The calcium oxalate is fed into the stream as a 2 weight percent dispersion in n-heptane. The aluminum fibers are fed into the stream in a 3 weight percent dispersion in n-heptane. The amount of the calcium oxalate burning depressant fed to the stream is controlled so as to provide 1 weight percent calcium oxalate, based on the combined weight of oxidizer and prepolymer and cure agent, at the beginning of the feed. Thereafter, the amount of calcium oxalate is gradually cut down to zero as the propellant grain is built up from the walls of the rotating mold to one-half the radius of the grain. At this point, the feed of copper chromate burning accelerator is cut in and the amount gradually increased from zero to substantially 0.2 weight percent as the propellant grain is further built up from one-half the radius of the grain to the innermost surface of the grain at the radius of the initial combustion cavity. In like manner, the amount of aluminum fibers fed to the mold is varied from a value equivalent to substantially 12 weight percent to substantially zero weight percent as the propellant grain is built up from the confines of the rotating mold to the inner surface of the cylindrical initial combustion cavity specified by grain design. The cast grain, with the fluid carrier removed, is placed in a furnace and maintained at a temperature of substantially 77° C. for a period of substantially 73 hours. The product is found to have set up so that all solid particles are firmly held together by the polymeric binder. Sectioning the grain and analysis of the composition shows that the particle size of the ammonium perchlorate has a continuous gradation from larger to smaller particle size as the radius measured from the axis of rotation of the grain during casting is decreased. In like manner, the amount of calcium oxalate burning rate depressant is found to progressively decrease in concentration from maximum radii of the grain relative to the distance from the axis of rotation of the grain during casting, to one-half the radius. In like manner, it is found that the amount of copper chromate burning rate accelerator varies from 0 to 0.2 weight percent, based on the amount of the ammonium perchlorate and polymeric binder, as the radius, measured from the axis of rotation of the grain during casting, decreased from one-half the maximum value to the innermost coaxial surface of the cast grain, i.e., the surface parallel to the axis of rotation at the limit of the initial combustion cavity. The texture of the polymeric binder is found to vary from hard to resilient with decreasing radius of the cast grain measured from the axis of rotation during casting. Upon firing in a stationary rocket motor on a test stand, it is found that the mass flow rate of combustion products remains relatively constant, and the chamber pressure remains relatively constant during the period of combustion despite the fact that the burning area within the combustion chamber is a continually increasing function of time.

An embodiment of this invention is to employ oxidizer particles which have been treated with an amine having the general formula

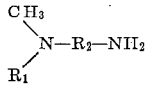

wherein $R_1$ is a member selected from the class consisting of hydrogen and hydrocarbon groups having from 1 to about 12 carbon atoms, and $R_2$ is a divalent hydrocarbon group having from 1 to about 12 carbon atoms. The hydrocarbon groups may be alkyl, alkenyl, aryl, alkaryl, arylkyl, and alicyclic. One example is an amine compound in which $R_1$ is hydrogen and $R_2$ is a methylene group. Another example is an amine in which $R_1$ is a methyl group and $R_2$ is a methylene group. Still another example is an amine in which $R_1$ is an n-dodecyl group and $R_2$ is a saturated hydrocarbon group containing 12 carbon atoms. A compound in which $R_1$ is cyclohexane and $R_2$ is a phenyl group is still another example. A method for the preparation of these amines is found in 38 J.A.C.S. 2141 (1916). In the treating process, from about 0.001 weight percent to about 30 weight percent amine is mixed with the oxidizer such as, for example, ammonium perchlorate. In the case of amines which are solids or semi-solids at ambient temperatures, as is the case where the hydrocarbon groups have a large number of carbon atoms, the mixture is heated during treatment. The amine passes in part or wholly into the crystal lattice of the oxidizer particles. The method of absorption is not known but it is postulated that the methyl groups penetrate the surface layer or layers of the ammonium perchlorate or other oxidizer particles, leaving the $NH_2$ groups free at the surface to react with the binder molecules when mixed with a polymeric composition. A non-limiting illustrative example is the mixing of 30 weight percent of amine having the general formula

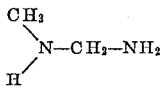

with 70 weight percent of ammonium perchlorate at a temperature sufficient to cause penetration into the crystal lattice of the ammonium perchlorate particles. Another example is the mixing of 0.001 weight percent of an amine having the formula

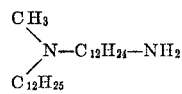

and 99.99 weight percent ammonium perchlorate, the mixture is heated to a temperature sufficient to bring about partial absorption of the amine onto the surface of the ammonium perchlorate particles. In like manner, the other amines having the general formula given above are absorbed onto the surface of solid particulate filling substances. The amine-treated solid particulate filling substances are then employed in the casting of polymeric mixtures in a rotating mold as described hereinabove. The prepolymer used for this example is of such nature that the amine-treated surface of the oxidizer particles serves as the polymeric curing agent resulting in firm attachment between oxidizer particles and the polymeric binder matrix. A non-limiting example of a suitable prepolymer is a compound of the formula

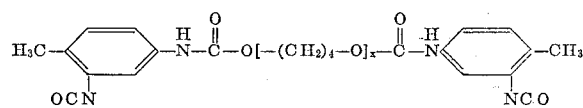

where $x$ is of a numerical value sufficient to yield a molecular weight of from about 400 to about 6,000.

EXAMPLE VI

The procedure of Example V is repeated with the modification that the ammonium perchlorate employed contains 30 weight percent amine having the formula

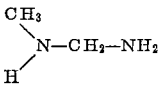

absorbed in the oxidizer crystals. Sectioning of a number of particles of ammonium perchlorate indicates that the amine has penetrated the surface layers of the particle as evidenced by the destruction of the X-ray crystal pattern regularity and reduction of vapor pressure of amine in presence of ammonium perchlorate crystals. Upon curing, it is found that the prepolymer is converted to a three-dimensional polymeric matrix as a result of the use of amine treated ammonium perchlorate as a somewhat unconventional cure agent. When the propellant grain of this example is fired in a rocket motor it is found that the grain remains intact until combustion takes place and the chamber pressure and mass flow rate remain relatively constant.

It is not known whether the amine molecules all remain in the crystal lattice during the cure step or are in part desorbed to react difunctionally with a portion of the prepolymer. It appears, however, that a useful degree of control over the rate of curing is obtained as a function of molecular weight and structure of the amine and the size of oxidizer particles in which the amine is absorbed. The latter factor implies that diffusion rate from the oxidizer particles is an important variable which can be manipulated to prevent, for example, excessive heat accumulation and premature auto-ignition of the propellant grain during the cure step.

EXAMPLE VII

The procedure of Example VI is repeated with the modification that ammonium perchlorate is employed Another embodiment of this invention is to first feed a case lining material to the rotating mold to form a liner layer on the inside of the rotating mold which will serve as a rocket motor casing. The liner composition consists of any plastic or rubber composition combined with an inert insulating material such as, for example, asbestos fibers. Preferably, the asbestos fibers are of a very low cross section of from about 5 to about 100 microns. To the naked eye the asbestos fibers appear as a powder. The amount of the inert insulating material in the binder layer varies from about 60 to about 85 weight percent. An example of a polymeric composition used as a case liner is polytetramethylene oxide glycol obtained by polymerizing tetrahydrofuran and then adding toluene diisocyanate to provide a molecular weight of the polymer molecules ranging from about 1,000 to about 4,000 according to the equation

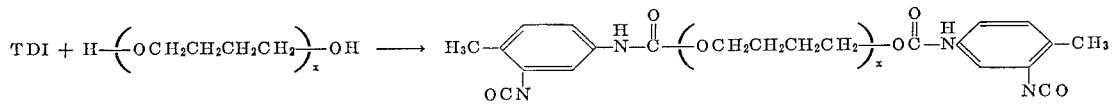

which has been treated with 0.01 weight percent amine having the formula

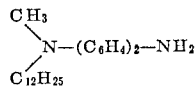

said weight being based on the weight percent of the amine and ammonium perchlorate combined. Upon curing, it is found that the prepolymer is partially converted to a three-dimensional polymeric matrix. Satisfactory performance is observed when the propellant grain cast by the method of this example is fired in a rocket motor.

An embodiment of this invention is to incorporate materials in the solid rocket propellant grain which are normally pyrophoric and are spontaneously combustible upon coming in contact with air. An example of this is pure aluminum powder or fibers having no oxide coating. The method of incorporating such materials is to maintain the pyrophoric materials slurried in an inert carrier or to first encapsulate them in an inert material such as, for example, polyethylene. The process of encapsulating powders and fibers is well known in the art and is described in U.S. Patent No. 2,642,345, as well as in other technical publications. It is also an embodiment of this invention to incorporate materials which are non-compatible with the oxidizer or binding composition by first encapsulating them as described hereinabove. For example, lithium hydride is normally a pyrophoric powder which reacts with ammonium perchlorate. The lithium hydride powder is encapsulated in polyethylene and then added by the process of this invention as described in this writing.

EXAMPLE VIII

The procedure of Example VI is repeated with the modification that pyrophoric aluminum encapsulated in 3 weight percent polyethylene is used in place of the normal aluminum fibers. The oxidizer used is ammonium perchlorate treated with hexymethylene diamine which serves as a cure agent for prepolymers prepared by reacting 4,4'-bis(phenyl)methylene diisocyanate and polyethers having the formula

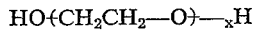

wherein x has the value of from about 7 to about 30, to provide a composition of the following structure:

An amount of castor oil is then added on casting as the curing agent sufficient to provide one OH group for each —NCO group present, but to leave from about 1 to about 5 percent excess of —NCO groups. An example of another material employed for centrifugally lining rocket motor cases prior to centrifugally casting rocket propellant grains therein is a polybutadiene-styrene copolymer, polybutadiene-acrylic acid copolymer, etc. Such materials are well known in the art and will not be described further in this writing. Any of the rubber compositions disclosed in the text, "Synthetic Rubber," by Whitby, published by John Wiley and Sons, Inc. (1954), may be used as a liner composition. The liner materials are used with or without inert insulating materials such as asbestos, mica, diatomaceous earth, etc.

Another embodiment of this invention is the addition of a chelating compound to the binder composition in a liner such as a phthalocyanine compound of the type described in U.S. Patent No. 2,479,491. Any chelating resin serves the purpose as, for example, the chelating resins described in U.S. Patent No. 2,888,441. The chelating compounds have the property of more readily adhering to the metal surface of a rocket motor case and also interacting with the polymeric composition of the liner. The amount of chelating agent in the liner composition varies from about 0.5 to about 10 weight percent, based on the amount of binder material.

An embodiment of this invention is to gradually change the chemical composition of a liner as deposition in the centrifugal casting proceeds. If the rocket motor casing is made of aluminum, for example, the initial feed of liner material to the rotating mold, which is also the case liner, is, in one instance, a copolymer of 50 mol percent diethyl silanediol and 50 mol percent diphenyldiisocyanatosilane, together with about 5 weight percent diethylenetriamine as a curing agent. This polymeric material adheres readily to the aluminum casing. The balance of the liner material can be of the same polymeric composition or, in some cases, a different polymeric composition is substituted, such as the polytetramethyleneoxide glycol polymer described hereinabove. The liner material, including the polymeric substance and the inert fibers such as the asbestos fibers, are added to the rotating mold in the same manner as the polymeric substance and oxidizer material are added as described in Example I above.

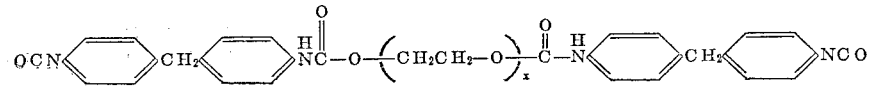

Glass fiber reinforced plastic rocket motor cases are employed wherein the plastic of the case is, for example, the polymerized product of a glycidyl polyether having an epoxide equivalent of 190-210, obtained by the copolymerization of epichlorohydrin and 2,2-bis(4-hydroxyphenyl)propane. The liner employed with such a case can be made of the same material as the binder. An example is the binder material described in Example I containing, in addition, from about 1 to about 5 weight percent diethylsilanediol. The silicon-containing compound with OH groups attached to the silicon atom serves to enhance the adhesion of the liner to the glass fibers protruding from the motor casing.

An embodiment of this invention, therefore, is the use of a case liner material having active functional groups on at least a portion of the polymer such that the polymer forms a firm bond with the rocket motor casing. Another embodiment is to roughen or abrade the inner surface of the rocket motor casing in order to secure a better bond between the case material and the liner. This is especially true in the case of glass-reinforced plastic rocket motor case since the abrading will cause the glass fiber filaments to protrude from the case wall and serve for better bonding with the liner material.

EXAMPLE IX

The procedure of Example V is followed employing a stainless steel rocket motor casing as a rotating mold. A liner material is first fed into the rotating mold consisting of a butadiene-styrene copolymer in the weight ratio of 95-to-5 containing 5 weight percent phthalocyanine-trisulphon-(p-aminoanilide) as a 15 weight percent dispersion in decane as a carrier and fine asbestos fibers having a cross sectional diameter of substantially 10 to 20 microns is fed from another container as a one weight percent dispersion in decane carrier. The amount of the asbestos fibers is substantially 80 weight percent, based on the asbestos and polymeric binder composition combined. The amount of binder composition deposited is sufficient to provide a liner 0.25 inch thick. Upon curing, it is found that the propellant grain adheres firmly to the motor casing. Satisfactory operation is observed upon firing of the rocket motor on a stationary test stand.

EXAMPLE X

The procedure of Example IX is repeated employing a glass fiber reinforced plastic rocket casing made of a glycidyl polyether resin obtained by reacting epichlorohydrin with 2,2-bis(4-hydroxyphenyl)propane. The polyether resin prior to molding has an epoxide equivalent of from about 190 to about 210. Ethylene diamine is used as a curing agent. About 40 weight percent of the casing is comprised of glass fibers having a cross-sectional diameter of about 300 to 400 microns. The inner surface is abraded so as to expose glass fibers for bonding with the liner material. The case is pre-treated with a compound having the formula

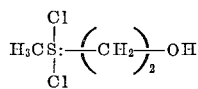

The liner is made of asbestos-loaded polymer made of polypropylene glycol and toluene diisocyanate as described above.

Other compositions employed in the process of this invention for casting solid rocket propellant grains as described in Example V are shown in the following table.

Table I

| Composition No. | Percent by Weight | | | | | | |
|---|---|---|---|---|---|---|---|
| | 1 | 2 | 3 | 4 | 5 | 6 | 7 |
| $NH_4ClO_4$ coarse | 50.03 | 60.00 | 50.03 | 50.03 | | | 49.00 |
| $NH_4ClO_4$ fine | 21.43 | 20.00 | 21.43 | 21.43 | | 20.00 | 21.00 |
| Para-quinone dioxime | 2.51 | 1.54 | 1.45 | 1.71 | 1.70 | | |
| Ferric oxide | 1.01 | | 1.01 | 1.01 | | | 1.00 |
| Sulfur | 0.45 | 0.03 | 0.45 | 0.15 | | | |
| Polymer A(a) | 24.57 | | 14.57 | 25.67 | | | |
| Diphenylguanidine | | 0.72 | | | | 0.80 | |
| Magnesium oxide | | 1.00 | | | | | |
| Polymer B(b) | | 16.71 | | | | | |
| Aluminum powder | | | 10.00 | | | 4.00 | |
| $KClO_4$ coarse | | | | | 54.00 | | |
| $KClO_4$ fine | | | | | 18.00 | | |
| Polymer C(c) | | | | | 25.50 | | |
| $NH_4NO_3$ granular | | | | | | 43.00 | |
| Epoxy resin D(d) | | | | | | 26.00 | |
| Dimethylamino methylphenol | | | | | | 1.00 | |
| Manganese oxide | | | | | | 4.00 | |
| Resin E(e) | | | | | | | 16.7 |
| Dioctyl Azelate | | | | | | | 9.8 |
| Methylene bis ortho-chloroanaline | | | | | | | 2.5 |

The particle size of ammonium perchlorate was varied during the casting in the rotating mold, as described in Example V.

In the above table, the polymers A, B, and C are partially polymerized polymeric materials having the general formula $$HS(SR-O-CH_2-O-RS)_nSH$$

in which R is a hydrocarbon group having from 1 to about 12 carbon atoms and n is a number selected from the series 1, 2, 3 . . ., to provide a polymer having an average molecular weight of from about 2,000 to about 3,000.

(a) In polymer A, the "R" in the above formula represents a $C_2H_4$ group and "n" has an average value of 6.
(b) In polymer B, "R" in the above formula represents a $C_4H_8$ aliphatic group and "n" has an average value of 6.
(c) In polymer C, "R" in the above formula represents a $C_2H_4$ group and "n" has an average value of 20.
(d) Epoxy resin D is a glycidyl polyether having terminal epoxy groups on each polymer molecule. It is obtained by copolymerizing equimolar quantities of epichlorohydrin and 2,2-bis(4-hydroxyphenyl)propane in the presence of a base such as sodium hydroxide to a product having a viscosity of substantially 1,000 centistokes.
(e) Resin E is a diisocyanate of a polyether of propylene glycol having the general formula $$ONC-C_3H_6-O-(C_3H_6-O)_n-C_3H_6-CNO$$

and having a molecular weight of from 2,000 to 3,000.

The dispersion medium employed in the preparation of the compositions shown in the table was n-heptane. The ratios by weight of dispersed substance-to-dispersion medium varied from about 1:19 to about 1:5.

The testing performance of rockets containing the propellants of this invention consisted of firing the rocket while anchored to a stand. The rocket was ignited by electrically actuating an igniter of a pyrotechnic composition placed in the firing chamber of the rocket. The pyrotechnic composition is composed of such material as black powder or a mixture of ammonium perchlorate and powdered metal such as aluminum, iron, magnesium, etc. The pressure generated within the firing chamber of the rocket is measured by means of a pressure pick-up. The thrust is measured by attaching the motor to a thrust cell which contains a strain gage adapted to indicate the magnitude of the thrust on an oscillograph to which it is connected. The rocket propellant composition of this invention, when tested in motors by this procedure, all give good results with respect to the combustion chamber pressure and thrust.

Rocket motors charged with the composition of this invention give good performance with respect to flight and range upon firing.

When the dispersion mediums employed are non-solvent towards the dispersed components, no coagulating agent is required.

In instances where a glass-fiber reinforced rocket motor casing is employed as the mold and a silicon-containing compound with hydroxy-substituents is included in the initial feed of materials to the mold, the amount considered as said initial feed should be sufficient to form a layer of deposited materials in the mold from about 0.002 to about 0.5 inch thick.

The centrifugal casting of propellant compositions is applicable to instances where no binder composition serves as the carrier. In this case, no other fluid substance is added and later withdrawn. For example, the process is carried out with the components of Example I without the carrier being present and with the possible modification that the mixing of the polymeric substances and oxidizer particles to form a substantially homogeneous composition can be carried out by conventional process, as in a slow speed Sigma bladed mixer. Several mixes are prepared with varying particle sizes and prepolymer compositions corresponding, for example, to the various batches of oxidizer of different particle size and various batches of binder materials of different chemical composition. These are fed to the rotating mold in proportions set forth in Example I to provide a varying composition in the molded article as a function of the radius of the cast article. In another variation of this process, a gas fluid is employed as the carrier for the polymeric substance and oxidizer particles.

In appropriate formulations in the practice of this invention, fast-curing agents are added separately and concurrently to the rotating mold to provide for rapid curing at least partially during the centrifugal casting.

Those skilled in the art will recognize that certain mixtures of different chemicals may produce compositions which are shock-sensitive or may be spontaneously explosive under certain conditions. An example of such a mixture is the combination of aluminum powder and chlorinated hydrocarbons. Adequate safety precautions, such as remote handling techniques, should be employed in the preparation of the compositions and in the practice of the process of this invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A process for molding an article of varying composition comprised of polymeric substances containing filling materials comprising providing a stream comprised of a fluid carrier having dispersed therein components of polymeric substances and filling materials, feeding said stream into a mold rotating about an internal axis, rotating said mold during said feeding at an r.p.m. sufficient to provide a centrifugal separation of said dispersed components from said carrier, and progressively building up said article from said components by successive centrifugal deposition, varying the particle size of said filling materials in said stream during said feeding, thereby varying the particle size of said filling substances in said successive depositions and providing an article having a composition which varies with distance of said deposition from the axis of rotation in said mold, and withdrawing said fluid carrier from said mold.

2. A process for molding an article of varying composition comprised of polymeric substances containing filling materials comprising providing a stream comprised of a fluid carrier having dispersed therein components of polymeric substances and filling materials, feeding said stream into a mold rotating about an internal axis, rotating said mold during said feeding at an r.p.m. sufficient to provide a centrifugal separation of said dispersed components from said carrier, and progressively building up said article from said components by successive centrifugal deposition, varying the composition of said polymeric substances in said stream during said feeding so as to provide polymeric substances with varying modulus of elasticity, thereby varying the modulus of elasticity of said polymeric substances in said successive depositions and providing an article having a composition which varies with distance of said deposition from the axis of rotation in said mold, and withdrawing said fluid carrier from said mold.

3. A process for molding a solid propellant rocket motor grain comprising providing a stream comprised of a fluid carrier dispersion medium having dispersed components therein, said dispersed components comprising polymer-forming materials which upon curing form a solid cohesive substance, and solid particulate filling substances, wherein said polymer-forming materials consist essentially of at least one component selected from the class consisting of silicone polymers, silicone rubbers, glycidyl polyethers having terminal epoxy groups, polyurethane material, polymerized di(thioethoxy)methylene, partially polymerized materials having the general formula $$HS(SR-O-CH_2-O-RS)_nSH$$

in which R is a hydrocarbon group and $n$ is a number selected from the series 1, 2, 3 . . ., and isocyanate resins having the general formula $$ONC-C_3H_6-O(C_3H_6-O)_n-C_3H_6-CNO$$

having a molecular weight of from about 2,000 to about 3,000, and said solid particulate substance in an inorganic perchlorate having the general formula $$M(ClO_4)_x$$

wherein M is selected from the class consisting of $NH_4$, Group I–A metals, Group I–B metals and Group II–A metals of the Periodic Table of Elements, and $x$ is the valence of M; wherein the ratio by weight of said dispersed components to said fluid carrier is from about 1:19 to about 1:1; and the ratio by weight of said inorganic perchlorate to said polymer-forming materials in said stream is from about 1:1 to about 9:1, feeding the contents of said stream into a rotating mold, varying the particle size of said inorganic perchlorate during said feeding from a range of 2–150 microns in diameter to about 20–500 microns in diameter as said feeding proceeds, rotating said mold during said feeding so as to impart a centrifugal action to said dispersed components, thereby separating said dispersed components from said carrier, collecting said components in said mold and withdrawing said fluid carrier from said mold.

4. A process for molding an article comprised of polymeric substances containing filling materials comprising providing a stream comprised of a fluid carrier dispersion medium having dispersed components therein, said dispersed components comprising polymer-forming materials which upon curing form a solid cohesive substance and solid particulate filling substances, wherein said polymer-forming materials consist essentially of at least one component selected from the class consisting of silicone polymers, silicone rubbers, glycidyl polyethers having terminal epoxy groups, polyurethane material, polymerized di(thioethoxy)methylene, partially polymerized materials having the general formula $$HS(SR-O-CH_2-O-RS)_nSH$$

in which R is a hydrocarbon group and $n$ is a number selected from the series 1, 2, 3 . . ., and isocyanate resins having the general formula $$ONC-C_3H_6-O(C_3H_6-O)_n-C_3H_6-CNO$$

having a molecular weight of from about 2,000 to about 3,000, and said particulate filling substance is composed of ammonium perchlorate, said ammonium perchlorate comprising substantially 30 weight percent fine particles and substantially 70 weight percent coarse particles, wherein the particle size of said fine particles is changed during said feeding from a range of 2–20 microns to a range of 20–60 microns in diameter and said coarse particles are changed from a diameter of 50–150 microns to a diameter of 300–500 microns as said feeding proceeds, the amount of said polymer material being sufficient to bind together said particles, feeding the contents of said stream into a rotating mold, rotating said mold during said feeding so as to impart a centrifugal action to said dispersed components, thereby separating said dispersed components from said carrier, collecting said components in said mold and withdrawing said fluid carrier from said mold.

5. The process of claim 4, wherein said stream contains, in addition, aluminum fibers having a cross sectional diameter of from about 3 to about 250 microns in an amount such that the ratio by weight of ammonium perchlorate-to-aluminum fibers is from about 60:20 to about 75:5.

6. The process of claim 4, wherein said stream contains, in addition, about 3–0 weight percent burning rate catalyst and about 0–3 weight percent burning rate suppressant, the amount of said catalyst in said stream initially being a predetermined maximum greater than zero, reducing said amount of said catalyst to zero as said stream is fed into said rotating mold, and progressively increasing the amount of said suppressant in said feed stream from zero at a predetermined time after beginning of said feeding of said stream to said mold to a predetermined maximum.

7. A process for molding a solid propellant rocket motor grain comprising providing a stream comprised of a fluid carrier dispersion medium having dispersed components therein, said dispersed components comprising polymer-forming materials which upon curing form a solid cohesive substance, and solid particulate filling substances, wherein said polymer-forming materials consist essentially of at least one component selected from the class consisting of silicone polymers, silicone rubbers, glycidyl polyethers having terminal epoxy groups, polyurethane material, polymerized di(thioethoxy)methylene, partially polymerized materials having the general formula $$HS(SR-O-CH_2-O-RS)_nSH$$

in which R is a hydrocarbon group and $n$ is a number selected from the series 1, 2, 3 . . ., and isocyanate resins having the general formula $$ONC-C_3H_6-O(C_3H_6-O)_n-C_3H_6-CNO$$

having a molecular weight of from about 2,000 to about 3,000, and said solid particulate substance is an inorganic perchlorate having the general formula $$M(ClO_4)_x$$

wherein M is selected from the class consisting of $NH_4$, Group I–A metals, Group I–B metals and Group II–A metals of the Periodic Table of Elements, and $x$ is the valence of M; wherein the ratio by weight of said dispersed components to said fluid carrier is from about 1:19 to about 1:1, and the ratio by weight of said inorganic perchlorate to said polymer-forming materials in said stream is from about 1:1 to about 9:1, said stream additionally containing a compatible curing agent, progressively decreasing the amount of said curing agent in said stream being fed to said rotating mold from a predetermined maximum to a predetermined minimum during said feeding, feeding the contents of said stream into a rotating mold, rotating said mold during said feeding so as to impart a centrifugal action to said dispersed components, thereby separating said dispersed components from said carrier, collecting said components in said mold and withdrawing said fluid carrier from said mold.

8. A process for molding a solid propellant rocket motor grain comprising providing a stream comprised of a fluid carrier dispersion medium having dispersed components therein, said dispersed components comprising a polyurethane material obtained by copolymerizing (a) polypropylene glycol and (b) toluene diisocyanate in the mole ratio of (a)-to-(b) of from about 1:1 to about 2:1, and said solid particulate substance is an inorganic perchlorate having the general formula $$M(ClO_4)_x$$

wherein M is selected from the class consisting of $NH_4$, group I–A metals, Group I–B metals, and Group II–A metals of the Periodic Table of Elements, and $x$ is the valence of M; wherein the ratio by weight of said dispersed components to said fluid carrier is from about 1:19 to about 1:1, and the ratio by weight of said inorganic perchlorate to said polymer-forming materials in said stream is from about 1:1 to about 9:1, feeding the contents of said stream into a rotating mold, rotating said mold during said feeding so as to impart a centrifugal action to said dispersed components, thereby separating said dispersed components from said carrier, wherein said ratio is varied during said feeding, collecting said components in said mold and withdrawing said fluid carrier from said mold.

9. A process for molding a solid propellant rocket motor grain comprising providing a stream comprised of a fluid carrier dispersion medium having dispersed components therein, said dispersed components comprising polymer-forming materials which upon curing form a solid cohesive substance and solid particulate filling substances, wherein said polymer-forming materials consist essentially of at least one component selected from the class consisting of silicone polymers, silicone rubbers, glycidyl polyethers having terminal epoxy groups, polyurethane material, polymerized di(thioethoxy)methylene, partially polymerized materials having the general formula $$HS(SR-O-CH_2-O-RS)_nSH$$

in which R is a hydrocarbon group and $n$ is a number selected from the series 1, 2, 3 . . ., and isocyanate resins having the general formula $$ONC-C_3H_6-O(C_3H_6-O)_n-C_3H_6-CNO$$

having a molecular weight of from about 2,000 to about 3,000, and said solid particulate substance consists essentially of at least one member selected from the class consisting of asbestos fibers and an inorganic perchlorate having the general formula $$M(ClO_4)_x$$

wherein M is selected from the class consisting of $NH_4$, Group I–A metals, Group I–B metals, and Group II–A metals of the Periodic Table of Elements, and $x$ is the valence of M; wherein the ratio by weight of said dispersed components-to-said fluid carrier is from about 1:19 to about 1:1, and the ratio by weight of said inorganic perchlorate to said polymer-forming materials in said stream is from about 1:1 to about 9:1, feeding the contents of said stream into a rotating mold, rotating said mold during said feeding so as to impart a centrifugal action to said dispersed components, thereby separating said dispersed components from said carrier, wherein said stream fed into said mold initially contains said polymer-forming material and said asbestos fibers and thereafter asbestos fibers are replaced by said inorganic perchlorate.

10. The process of claim 9, further comprising feeding said polymer-forming material into said mold initially in the presence of from about 0.5 to about 10 weight percent of a chelating compound, based on the weight of said polymer-forming material, to a predetermined thickness of deposit within said mold.

11. The process of claim 9, wherein said mold is a glass-fiber reinforced plastic rocket motor case having protruding glass fibers on the interior surface thereof, and wherein the stream initially fed into said mold contains from about 1 to about 5 weight percent, based on the weight of said polymer-forming material, of silicone resin components having OH groups attached to the silicon atom.

References Cited by the Examiner

UNITED STATES PATENTS

| | | | |
|---|---|---|---|
| 768,306 | 8/1904 | Rivers. | |
| 965,630 | 7/1910 | Jaubert | 252—187 |
| 1,520,749 | 12/1924 | Brownrigg. | |
| 1,630,762 | 5/1927 | Randall | 264—86 |
| 1,642,546 | 9/1927 | Hennessy. | |
| 1,966,652 | 7/1934 | Tanner | 252—187 |
| 2,342,801 | 2/1944 | Guerci | 264—86 |
| 2,390,160 | 12/1945 | Marvin | 18—58.3 X |
| 2,462,194 | 2/1949 | Hutchinson | 252—187 |
| 2,739,917 | 3/1956 | Schulze | 18—58.3 X |
| 2,834,737 | 5/1958 | Farkas | 252—187 |
| 2,887,729 | 5/1959 | Usab | 18—58.3 |
| 2,888,714 | 6/1959 | Bray | 18—58.3 |
| 2,921,911 | 1/1960 | Staubly | 252—187 |
| 2,972,782 | 2/1961 | Archibald | 18—58.3 |
| 2,993,235 | 7/1961 | Brown et al. | 18—58.3 |
| 3,022,149 | 2/1962 | Cramer | 149—19 |

LEON D. ROSDOL, *Primary Examiner.*

MICHAEL V. BRINDISI, ROBERT F. WHITE, CARL D. QUARFORTH, *Examiners.*

N. YUDKOFF, T. F. SHANAHAN, L. D. RUTLEDGE,
*Assistant Examiners.*